United States Patent
Murayama et al.

(10) Patent No.: US 12,317,144 B2
(45) Date of Patent: May 27, 2025

(54) RADIO COMMUNICATION SYSTEM, CONTROL METHOD AND CONTROL DEVICE FOR RADIO COMMUNICATION SYSTEM, AND RADIO COMMUNICATION SYSTEM CONTROL PROGRAM

(71) Applicant: Nippon Telegraph and Telephone Corporation, Tokyo (JP)

(72) Inventors: Daisuke Murayama, Musashino (JP); Kenichi Kawamura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 409 days.

(21) Appl. No.: 18/010,038

(22) PCT Filed: Jun. 15, 2020

(86) PCT No.: PCT/JP2020/023452
§ 371 (c)(1),
(2) Date: Dec. 13, 2022

(87) PCT Pub. No.: WO2021/255794
PCT Pub. Date: Dec. 23, 2021

(65) Prior Publication Data
US 2023/0232288 A1 Jul. 20, 2023

(51) Int. Cl.
*H04W 36/00* (2009.01)
(52) U.S. Cl.
CPC ............... *H04W 36/0072* (2013.01)
(58) Field of Classification Search
CPC ..... H04L 5/005; H04L 5/0053; H04L 5/0094; H04W 24/02; H04W 36/0072; H04W 72/04
See application file for complete search history.

(56) References Cited

U.S. PATENT DOCUMENTS 5,761,196 A * 6/1998 Ayerst ............... H04W 16/12
370/335
10,225,812 B2 * 3/2019 Seo ............... H04W 76/14
(Continued)

FOREIGN PATENT DOCUMENTS

| JP | 2014-523718 | 9/2014 |
| WO | WO 2016/002323 | 7/2016 |

OTHER PUBLICATIONS

Takeda et al., "NR Physical Layer Specifications in 5G," NTT Docomo Technical Journal, vol. 26, No. 3, pp. 47 to 58, Nov. 2018 (with English machine translation).

*Primary Examiner* — Dung B Huynh
(74) *Attorney, Agent, or Firm* — Fish & Richardson P.C.

(57) ABSTRACT

A specific signal in a radio communication system includes at least one of a synchronization signal and a reference signal. A first radio communication system performing radio communication in a first cell generates the specific signal based on a first seed and uses a first resource mapping pattern as a resource mapping pattern of the specific signal. A second radio communication system performing radio communication in a second cell that is adjacent to the first cell generates the specific signal based on a second seed and uses a second resource mapping pattern as a resource mapping pattern of the specific signal. When the first resource mapping pattern is identical to the second resource mapping pattern, the first seed and the second seed are set to be different from each other through sequence seed control.

7 Claims, 14 Drawing Sheets

(56) References Cited

U.S. PATENT DOCUMENTS

| | | | | |
|---|---|---|---|---|
| 12,255,845 B2* | 3/2025 | Miao | | H04L 5/0053 |
| 2010/0118996 A1* | 5/2010 | Sundaresan | | H04W 72/04 |
| | | | | 375/260 |
| 2011/0105163 A1* | 5/2011 | Lee | | H04W 72/54 |
| | | | | 455/501 |
| 2011/0243023 A1* | 10/2011 | Taoka | | H04L 5/0023 |
| | | | | 370/252 |
| 2011/0310838 A1* | 12/2011 | Zheng | | H04L 5/0053 |
| | | | | 370/329 |
| 2011/0317780 A1* | 12/2011 | Kang | | H04L 5/0053 |
| | | | | 375/259 |
| 2012/0039216 A1* | 2/2012 | Li | | H04L 5/0032 |
| | | | | 370/254 |
| 2012/0250642 A1* | 10/2012 | Qu | | H04W 24/10 |
| | | | | 370/329 |
| 2013/0114390 A1* | 5/2013 | Chu | | H04B 3/32 |
| | | | | 370/201 |
| 2013/0155996 A1* | 6/2013 | Horiuchi | | H04W 72/23 |
| | | | | 370/329 |
| 2013/0287064 A1* | 10/2013 | Seo | | H04L 5/0051 |
| | | | | 375/144 |
| 2013/0331138 A1* | 12/2013 | Kim | | H04W 48/12 |
| | | | | 455/509 |
| 2014/0071936 A1* | 3/2014 | Zhang | | H04L 5/0016 |
| | | | | 370/330 |
| 2014/0092823 A1* | 4/2014 | Song | | H04L 5/001 |
| | | | | 370/329 |
| 2015/0043370 A1* | 2/2015 | Zhang | | H04W 24/02 |
| | | | | 370/252 |
| 2015/0085833 A1* | 3/2015 | Han | | H04L 27/2603 |
| | | | | 370/336 |
| 2015/0215879 A1* | 7/2015 | Zhu | | H04W 56/0015 |
| | | | | 370/350 |
| 2015/0229413 A1* | 8/2015 | Takeda | | H04W 72/23 |
| | | | | 370/329 |
| 2015/0249974 A1* | 9/2015 | Lee | | H04W 72/0446 |
| | | | | 370/329 |
| 2015/0256307 A1* | 9/2015 | Nagata | | H04W 24/00 |
| | | | | 370/328 |
| 2015/0303958 A1* | 10/2015 | Davydov | | H04W 72/20 |
| | | | | 375/341 |
| 2015/0304886 A1* | 10/2015 | Liu | | H04L 47/829 |
| | | | | 370/254 |
| 2015/0341942 A1* | 11/2015 | Lee | | H04W 72/23 |
| | | | | 370/252 |
| 2016/0205674 A1* | 7/2016 | Zhang | | H04L 27/2613 |
| | | | | 370/330 |
| 2016/0212636 A1* | 7/2016 | Dimou | | H04W 48/10 |
| 2016/0323811 A1* | 11/2016 | Lepp | | H04W 48/12 |
| 2017/0026219 A1* | 1/2017 | Atungsiri | | H04L 27/26136 |
| 2017/0041932 A1* | 2/2017 | Chae | | H04B 7/26 |
| 2017/0141907 A1* | 5/2017 | Takeda | | H04L 5/0051 |
| 2017/0272141 A1* | 9/2017 | Horiuchi | | H04L 5/0051 |
| 2018/0020454 A1* | 1/2018 | Lim | | H04W 72/0466 |
| 2018/0049190 A1* | 2/2018 | Abedini | | H04L 5/005 |
| 2018/0054270 A1* | 2/2018 | Xiong | | H04J 11/0053 |
| 2018/0091277 A1* | 3/2018 | Davydov | | H04L 5/0057 |
| 2018/0146494 A1* | 5/2018 | Khoryaev | | H04W 76/15 |
| 2018/0254864 A1* | 9/2018 | Bontu | | H04L 5/0035 |
| 2018/0270771 A1* | 9/2018 | Chendamarai Kannan | | |
| | | | | H04L 27/2675 |
| 2018/0309553 A1* | 10/2018 | Cao | | H04L 5/0048 |
| 2018/0367233 A1* | 12/2018 | Nam | | H04J 11/0076 |
| 2018/0368089 A1* | 12/2018 | Yerramalli | | H04J 11/0069 |
| 2019/0045499 A1* | 2/2019 | Huang | | H04L 5/0053 |
| 2019/0123870 A1* | 4/2019 | Frenne | | H04B 7/068 |
| 2019/0149298 A1* | 5/2019 | Yang | | H04B 7/0456 |
| | | | | 370/336 |
| 2019/0173711 A1* | 6/2019 | Cheng | | H04L 27/2627 |
| 2019/0173723 A1* | 6/2019 | Saito | | H04W 72/0446 |
| 2019/0174406 A1* | 6/2019 | Hwang | | H04W 36/08 |
| 2019/0273637 A1* | 9/2019 | Zhang | | H04L 5/0051 |
| 2019/0281563 A1* | 9/2019 | Lee | | H04W 72/30 |
| 2019/0297620 A1* | 9/2019 | Tian | | H04W 28/0205 |
| 2019/0305911 A1* | 10/2019 | Sarkis | | H04L 5/0048 |
| 2019/0327048 A1* | 10/2019 | Hosseini | | H04B 7/0697 |
| 2019/0342061 A1* | 11/2019 | Kim | | H04L 5/10 |
| 2020/0014481 A1* | 1/2020 | Chervyakov | | H04J 11/0056 |
| 2020/0015274 A1* | 1/2020 | Islam | | H04W 74/0833 |
| 2020/0068549 A1* | 2/2020 | Kang | | H04W 16/28 |
| 2020/0128498 A1* | 4/2020 | Harada | | H04L 5/0048 |
| 2020/0260499 A1* | 8/2020 | Sarkis | | H04W 74/004 |
| 2021/0076389 A1* | 3/2021 | Zhang | | H04L 27/2694 |
| 2021/0076417 A1* | 3/2021 | Bayesteh | | H04W 80/02 |
| 2021/0084615 A1* | 3/2021 | Priyanto | | H04W 68/06 |
| 2021/0105113 A1* | 4/2021 | Saito | | H04L 5/0051 |
| 2021/0144596 A1* | 5/2021 | Yang | | H04W 52/0248 |
| 2021/0195605 A1* | 6/2021 | Nilsson | | H04W 72/044 |
| 2021/0258939 A1* | 8/2021 | Zhang | | H04W 72/044 |
| 2021/0385818 A1* | 12/2021 | Levitsky | | H04W 72/569 |
| 2021/0392022 A1* | 12/2021 | Iwai | | H04J 13/0062 |
| 2022/0201687 A1* | 6/2022 | Manolakos | | H04L 5/0053 |
| 2022/0210816 A1* | 6/2022 | Wu | | H04W 72/1273 |
| 2022/0272736 A1* | 8/2022 | Matsumura | | H04L 5/0091 |
| 2023/0179373 A1* | 6/2023 | Mu | | H04L 5/0053 |
| | | | | 370/329 |
| 2023/0179379 A1* | 6/2023 | Better | | H04L 5/005 |
| | | | | 370/329 |
| 2024/0259078 A1* | 8/2024 | Gao | | H04W 16/28 |

* cited by examiner

RADIO COMMUNICATION SYSTEM, CONTROL METHOD AND CONTROL DEVICE FOR RADIO COMMUNICATION SYSTEM, AND RADIO COMMUNICATION SYSTEM CONTROL PROGRAM

CROSS-REFERENCE TO RELATED APPLICATIONS

This application is a National Stage application under 35 U.S.C. § 371 of International Application No. PCT/JP2020/023452, having an International Filing Date of Jun. 15, 2020.

The disclosure of the prior application is considered part of the disclosure of this application, and is incorporated by reference in its entirety into this application.

TECHNICAL FIELD

The present disclosure relates to a technique for controlling a radio communication system. In particular, the present disclosure relates to a technique for controlling a specific signal such as a synchronization signal and a reference signal used in a radio communication system.

BACKGROUND ART

NPL 1 discloses a physical layer specification of a new radio (NR) that is a radio communication scheme of a 5th generation mobile communication system (5G). In the NR, various reference signals are defined and mapped to radio resource (RE) separately from a payload of data/control signals. A plurality of "resource mapping patterns" which are patterns of the mapping position of the reference signal are defined. The same applies to a synchronization signal used for initial access.

A specific signal such as the synchronization signal and the reference signal is a sequence signal generated based on a seed. For example, the seed includes a cell ID. For example, the specific signal is a quasi-orthogonal M-sequence generated based on the seed including the cell ID.

In recent years, local 5G (L5G) in which a party other than telecommunications carriers locally constructs and operates its own 5G system has been proposed. For example, a business operator having a plant may operate its own 5G system in the plant premises. For frequency sharing, it is important to study radio wave interference between L5G systems whose cells are adjacent to each other.

CITATION LIST

Non Patent Literature

NPL 1: Takeda et al., "NR Physical Layer Specifications in 5G," NTT DOCOMO Technical Journal, Vol. 26, No. 3, pp. 47 to 58, November 2018

SUMMARY OF THE INVENTION

Technical Problem

Two radio communication systems respectively performing radio communications in adjacent cells are considered. There is a possibility that radio wave interference occurs mutually or unilaterally between the two adjacent radio communication systems. In such a situation, a case where a resource mapping pattern of a specific signal such as a synchronization signal and a reference signal is identical between the adjacent radio communication systems is considered. In that case, there is a possibility that respective specific signals of the adjacent radio communication systems collide and thus the specific signals are hard to separate from each other. Degradation of the specific signal leads to degradation of communication quality. Meanwhile, exclusively mapping (scheduling) the respective specific signals of the adjacent radio communication systems leads to reduction in resource utilization efficiency.

An object of the present disclosure is to provide a technique capable of separating respective specific signals (at least one of synchronization signals and reference signals) of adjacent radio communication systems to suppress degradation of communication quality.

Means for Solving the Problem

A first aspect relates to a radio communication system that performs radio communication in a first cell.

The radio communication system includes:
  a base station configured to generate, based on a first seed, a specific signal including at least one of a synchronization signal and a reference signal and to use a first resource mapping pattern as a resource mapping pattern of the specific signal to perform the radio communication; and
  a control device configured to set the first seed and the first resource mapping pattern.

In a second cell that is adjacent to the first cell, a second radio communication system is configured to generate the specific signal based on a second seed and to use a second resource mapping pattern as a resource mapping pattern of the specific signal to perform radio communication.

The control device is configured to set the first seed to be different from the second seed when the first resource mapping pattern is identical to the second resource mapping pattern.

A second aspect relates to a control method for a radio communication system.

In a first cell, a first radio communication system is configured to generate, based on a first seed, a specific signal including at least one of a synchronization signal and a reference signal and to use a first resource mapping pattern as a resource mapping pattern of the specific signal to perform radio communication.

In a second cell that is adjacent to the first cell, a second radio communication system is configured to generate the specific signal based on a second seed and to use a second resource mapping pattern as a resource mapping pattern of the specific signal to perform radio communication.

The control method for the radio communication system includes a process of setting the first seed and the second seed to be different from each other when the first resource mapping pattern is identical to the second resource mapping pattern.

A third aspect relates to a control device for a radio communication system.

In a first cell, the radio communication system is configured to generate, based on a first seed, a specific signal including at least one of a synchronization signal and a reference signal and to use a first resource mapping pattern as a resource mapping pattern of the specific signal to perform radio communication.

In a second cell that is adjacent to the first cell, a second radio communication system is configured to generate the specific signal based on a second seed and to use a second resource mapping pattern as a resource mapping pattern of the specific signal to perform radio communication.

The control device for the radio communication system is configured to set the first seed to be different from the second seed when the first resource mapping pattern is identical to the second resource mapping pattern.

A fourth aspect relates to a radio communication system control program. The radio communication system control program is executed by a computer and causes the computer to operate as the above-described control device. The radio communication system control program may be recorded on a non-transitory computer-readable recording medium. The radio communication system control program may be provided via a network.

Effects of the Invention

In the first cell, the specific signal is generated based on the first seed, and the first resource mapping pattern is used as the resource mapping pattern of the specific signal. In the second cell that is adjacent to the first cell, the specific signal is generated based on the second seed, and the second resource mapping pattern is used as the resource mapping pattern of the specific signal. The first seed and the second seed are set to be different from each other in the situation where the first resource mapping pattern is identical to the second resource mapping pattern. It is thus possible to separate the respective specific signals of the adjacent radio communication systems from each other. In other words, interference resistance of the specific signal is improved. As a result, degradation of communication quality is suppressed.

In addition, it is not necessary to exclusively map (schedule) the respective specific signals of the adjacent radio communication systems. Therefore, reduction in resource utilization efficiency also is suppressed.

DESCRIPTION OF EMBODIMENTS

Hereinafter, embodiments of the present disclosure will be described with reference to the attached drawings.

1. Overview 1-1. Radio Communication System

Figure 1:
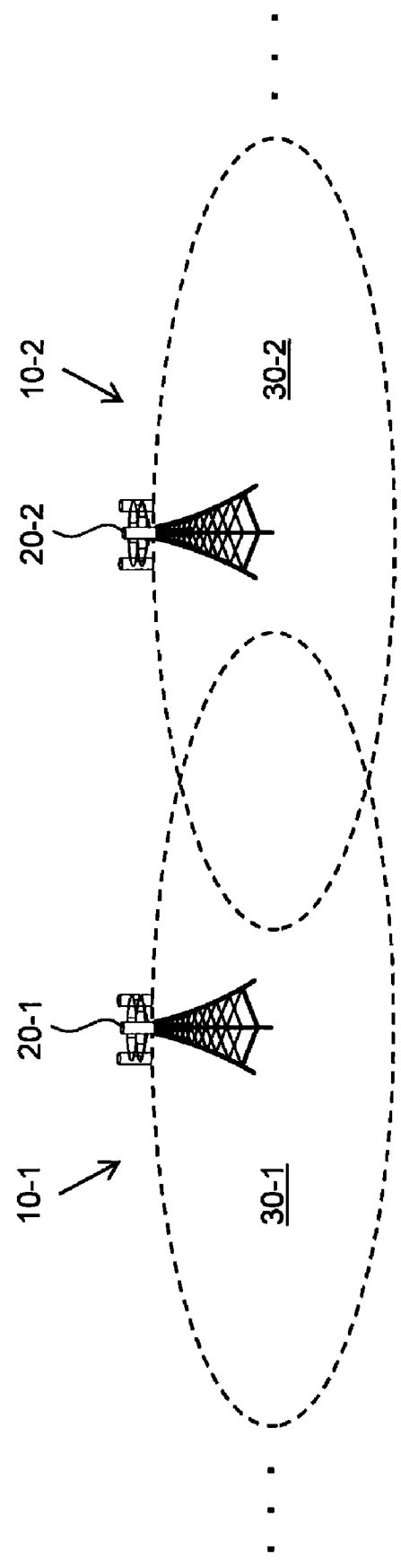
FIG. 1 is a conceptual diagram for explaining an overview of a plurality of radio communication systems according to an embodiment of the present disclosure.

FIG. 1 is a conceptual diagram for explaining an overview of a plurality of radio communication systems 10 according to the present embodiment. Each radio communication system 10 includes a base station 20 and performs radio communication in a cell 30 around the base station 20.

FIG. 1 shows two adjacent radio communication systems 10-1 and 10-2 as representatives. The first radio communication system 10-1 includes a first base station 20-1 and performs radio communication in a first cell 30-1 around the first base station 20-1. The second radio communication system 10-2 includes a second base station 20-2 and performs radio communication in a second cell 30-2 around the second base station 20-2. The first cell 30-1 and the second cell 30-2 are adjacent to each other. Here, "the two cells being adjacent to each other" also includes a situation where the two cells partially overlap each other. Also, the first radio communication system 10-1 and the second radio communication system 10-2 share the same frequency band.

For example, the first radio communication system 10-1 and the second radio communication system 10-2 are local 5G (L5G) systems. The first radio communication system 10-1 and the second radio communication system 10-2 are operated in adjacent areas. For example, the first radio communication system 10-1 and the second radio communication system 10-2 are operated by different business operators.

1-2. Specific Signal (Synchronization Signal and Reference Signal)

Next, a synchronization signal and a reference signal used in the radio communication performed by the radio communication systems 10 are considered.

A synchronization signal (SS) is a known sequence signal used for an initial access. Examples of the synchronization signal include a primary synchronization signal (PSS) and a secondary synchronization signal (SSS). A user equipment (UE) detects the synchronization signal transmitted from the base station 20, performs synchronization with the base station, and establishes connection with the base station.

A reference signal (RS) also is a known sequence signal. For example, the reference signal is used by the user equipment or the base station 20 to perform channel estimation.

In the following description, the "specific signal" means at least one of the synchronization signal and the reference signal. The specific signal is a sequence signal generated based on a seed. For example, the seed includes a cell ID. For example, the specific signal is a quasi-orthogonal M-sequence generated based on the seed including the cell ID.

The specific signal is mapped to radio resource (RE). In other words, scheduling of the specific signal is performed. A pattern of a mapping position of the specific signal is hereinafter referred to as a "resource mapping pattern MP."

Figure 2:
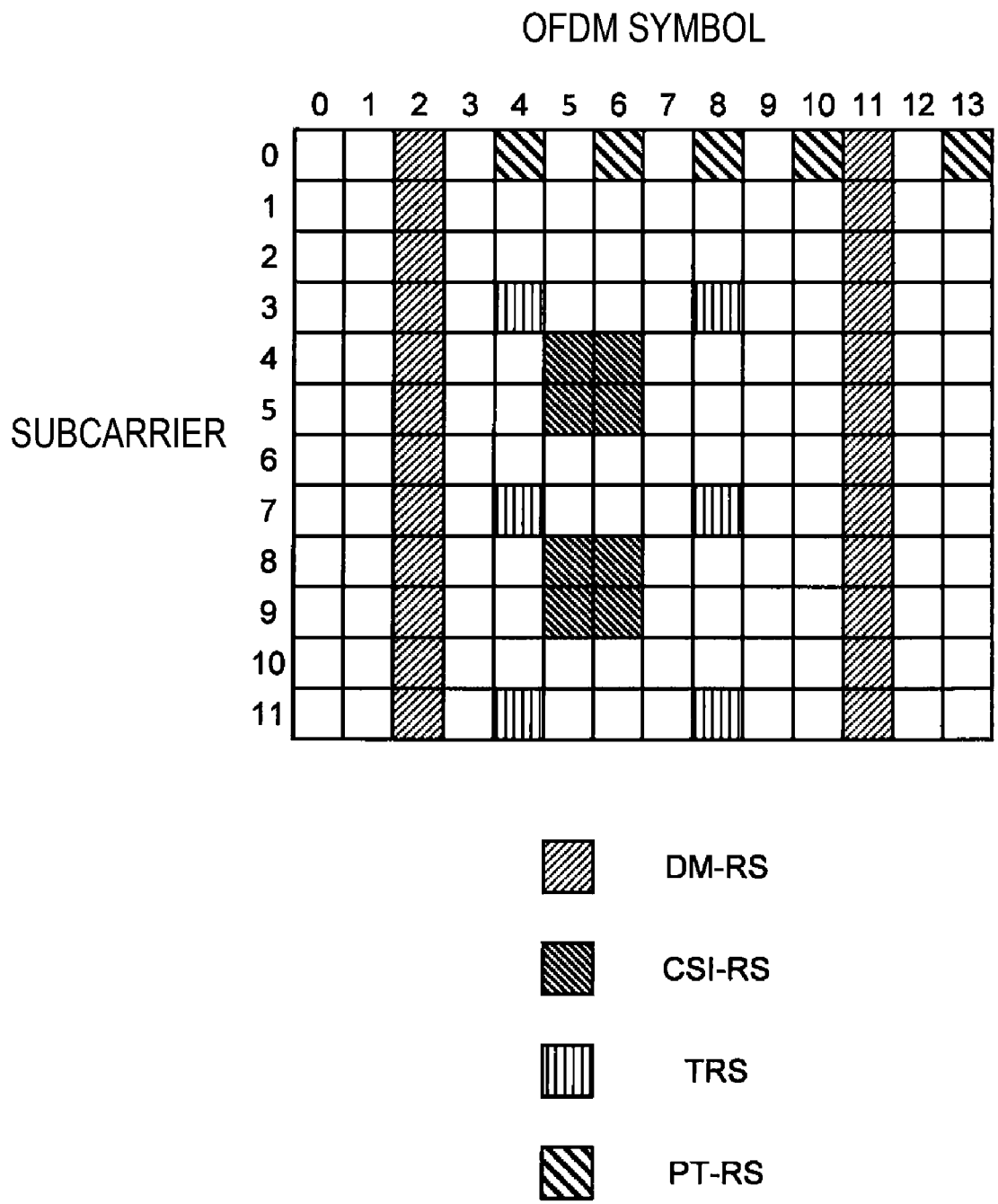
FIG. 2 is a conceptual diagram showing an example of a resource mapping pattern of a reference signal.

FIG. 2 shows an example of the resource mapping pattern of the reference signal in the new radio (NR) (see NPL 1). In the example shown in FIG. 2, one OFDM symbol is composed of twelve subcarriers, and one slot is composed of fourteen OFDM symbols. DM-RS (Demodulation RS) is a reference signal for data demodulation. CSI-RS (Channel State Information RS) is a reference signal for channel estimation. TRS (Tracking RS) is a reference signal for time/frequency tracking. PT-RS (Phase Tracking RS) is a reference signal for phase noise estimation.

1-3. Setting of Resource Mapping Pattern

Figure 3:
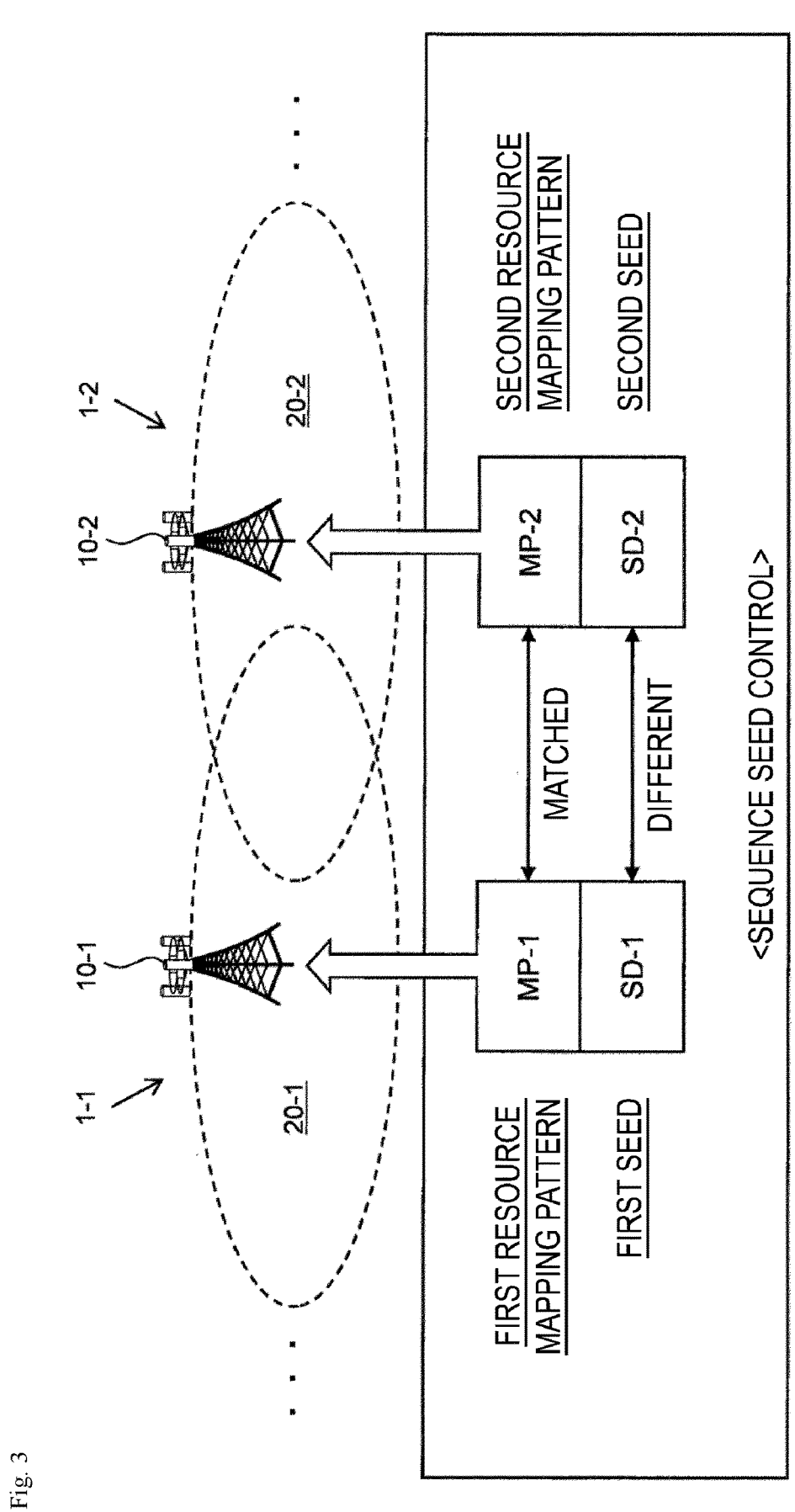
FIG. 3 is a conceptual diagram for explaining resource mapping pattern control according to an embodiment of the present disclosure.

FIG. 3 is a conceptual diagram for explaining setting of the resource mapping pattern MP according to the present embodiment. The first radio communication system 10-1 performs the radio communication by using a "first resource mapping pattern MP-1" as the resource mapping pattern MP of the specific signal. The second radio communication system 10-2 performs the radio communication by using a "second resource mapping pattern MP-2" as the resource mapping pattern MP of the specific signal.

In the present embodiment, the first resource mapping pattern MP-1 and the second resource mapping pattern MP-2 are set to be identical to each other. For example, the resource mapping pattern MP is uniquely defined for each country or for each region. In another example, the first radio communication system 10-1 and the second radio communication system 10-2 may cooperate to make the first resource mapping pattern MP-1 and the second resource mapping pattern MP-2 be identical to each other.

In addition, a subcarrier interval also is identical between the first radio communication system 10-1 and the second radio communication system 10-2. Moreover, time synchronization between the first radio communication system 10-1 and the second radio communication system 10-2 is achieved.

1-4. Sequence Seed Control

There is a possibility that radio wave interference occurs mutually or unilaterally between the first radio communication system 10-1 and the second radio communication system 10-2 that are adjacent to each other. Therefore, when the first resource mapping pattern MP-1 is identical to the second resource mapping pattern MP-2, there is a possibility that respective specific signals of the first radio communication system 10-1 and the second radio communication system 10-2 collide and thus the specific signals are hard to separate from each other. Degradation of the specific signal leads to degradation of communication quality.

For example, if the reference signals collide against each other and the signal degradation is caused, accuracy of the channel estimation or the like based on the reference signal is degraded. Also, if the synchronization signal for the initial access is degraded and a probability of detection of the synchronization signal decreases, a probability of the initial access decreases.

In view of the above, according to the present embodiment, "sequence seed control" is performed in order to facilitate separation of the respective specific signals of the first radio communication system 10-1 and the second radio communication system 10-2.

The "sequence seed control" according to the present embodiment will be described with reference to FIG. 3. The first radio communication system 10-1 uses a "first seed SD-1" as the seed for the specific signal. In other words, the first radio communication system 10-1 generates the specific signal based on the first seed SD-1. The second radio communication system 10-2 uses a "second seed SD-2" as the seed for the specific signal. In other words, the second radio communication system 10-2 generates the specific signal based on the second seed SD-2.

The sequence seed control sets the first seed SD-1 and the second seed SD-2 to be different from each other. Typically, a plurality of seed candidates SDS that are different from each other are defined in advance. Then, the first seed SD-1 and the second seed SD-2 are selected to be different from each other from among the predetermined seed candidates SDS. It is thus possible to separate the respective specific signals of the first radio communication system 10-1 and the second radio communication system 10-2. In other words, interference resistance of the specific signal is improved. As a result, degradation of communication quality is suppressed.

The sequence seed control is executed by at least one of the first radio communication system 10-1 and the second radio communication system 10-2. Both the first radio communication system 10-1 and the second radio communication system 10-2 may execute the sequence seed control.

Various examples are conceivable as specific methods for the sequence seed control. The various examples of the sequence seed control will be described below.

1-5. Effects

As described above, the first radio communication system 10-1 performing the radio communication in the first cell 30-1 generates the specific signal based on the first seed SD-1 and uses the first resource mapping pattern MP-1 as the resource mapping pattern MP of the specific signal. The second radio communication system 10-2 performing the radio communication in the second cell 30-2 adjacent to the first cell 30-1 generates the specific signal based on the second seed SD-2 and uses the second resource mapping pattern MP-2 as the resource mapping pattern MP of the specific signal.

In the present embodiment, the first resource mapping pattern MP-1 and the second resource mapping pattern MP-2 are identical to each other. However, the first seed SD-1 and the second seed SD-2 are set to be different from each other through the sequence seed control. It is thus possible to separate the respective specific signals of the first radio communication system 10-1 and the second radio communication system 10-2. In other words, the interference resistance of the specific signal is improved. As a result, the degradation of communication quality is suppressed.

In addition, according to the present embodiment, it is not necessary to exclusively map (schedule) the respective specific signals of the first radio communication system 10-1 and the second radio communication system 10-2. Therefore, reduction in resource utilization efficiency also is suppressed.

The present embodiment is useful for the local 5G (L5G) system, for example.

2. Configuration Example of Radio Communication System

Figure 4:
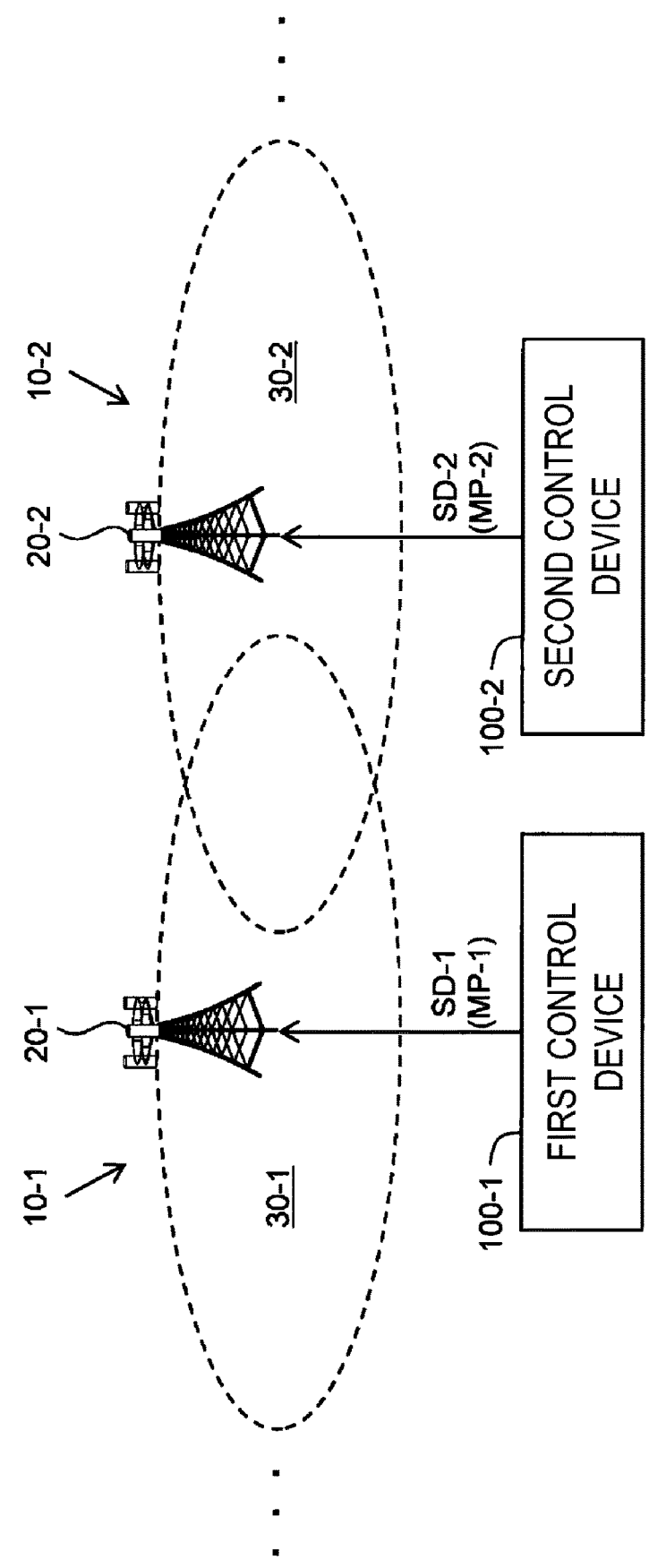
FIG. 4 is a conceptual diagram for explaining a configuration example of a radio communication system according to an embodiment of the present disclosure.

FIG. 4 is a conceptual diagram for explaining a configuration example of the radio communication system 10 according to the present embodiment. Each radio communication system 10 includes a control device 100 in addition to the base station 20.

The first radio communication system 10-1 includes a first control device 100-1 in addition to the first base station 20-1 that performs the radio communication in the first cell 30-1. The first control device 100-1 performs the sequence seed control to set the first seed SD-1. In addition, the first control device 100-1 sets the first resource mapping pattern MP-1 as necessary. The first base station 20-1 generates the specific signal based on the first seed SD-1 set by the first control device 100-1. Then, the first base station 20-1 performs the radio communication by using the first resource mapping pattern MP-1 as the resource mapping pattern MP of the specific signal.

The second radio communication system 10-2 includes a second control device 100-2 in addition to the second base station 20-2 that performs the radio communication in the second cell 30-2. The second control device 100-2 performs the sequence seed control to set the second seed SD-2. In addition, the second control device 100-2 sets the second resource mapping pattern MP-2 as necessary. The second base station 20-2 generates the specific signal based on the second seed SD-2 set by the second control device 100-2. Then, the second base station 20-2 performs the radio communication by using the second resource mapping pattern MP-2 as the resource mapping pattern MP of the specific signal.

A position and a connection configuration of the control device 100 are not limited in particular. The control device 100 may be included in a core unit or may be included in a base station control unit. The control device 100 may be disposed in the vicinity of the base station 20 or may be disposed at a position away from the base station 20 via a network. The control device 100 and the base station 20 are preferably connected in a wired manner. The control device 100 and the base station 20 may be connected in a radio manner.

Figure 5:
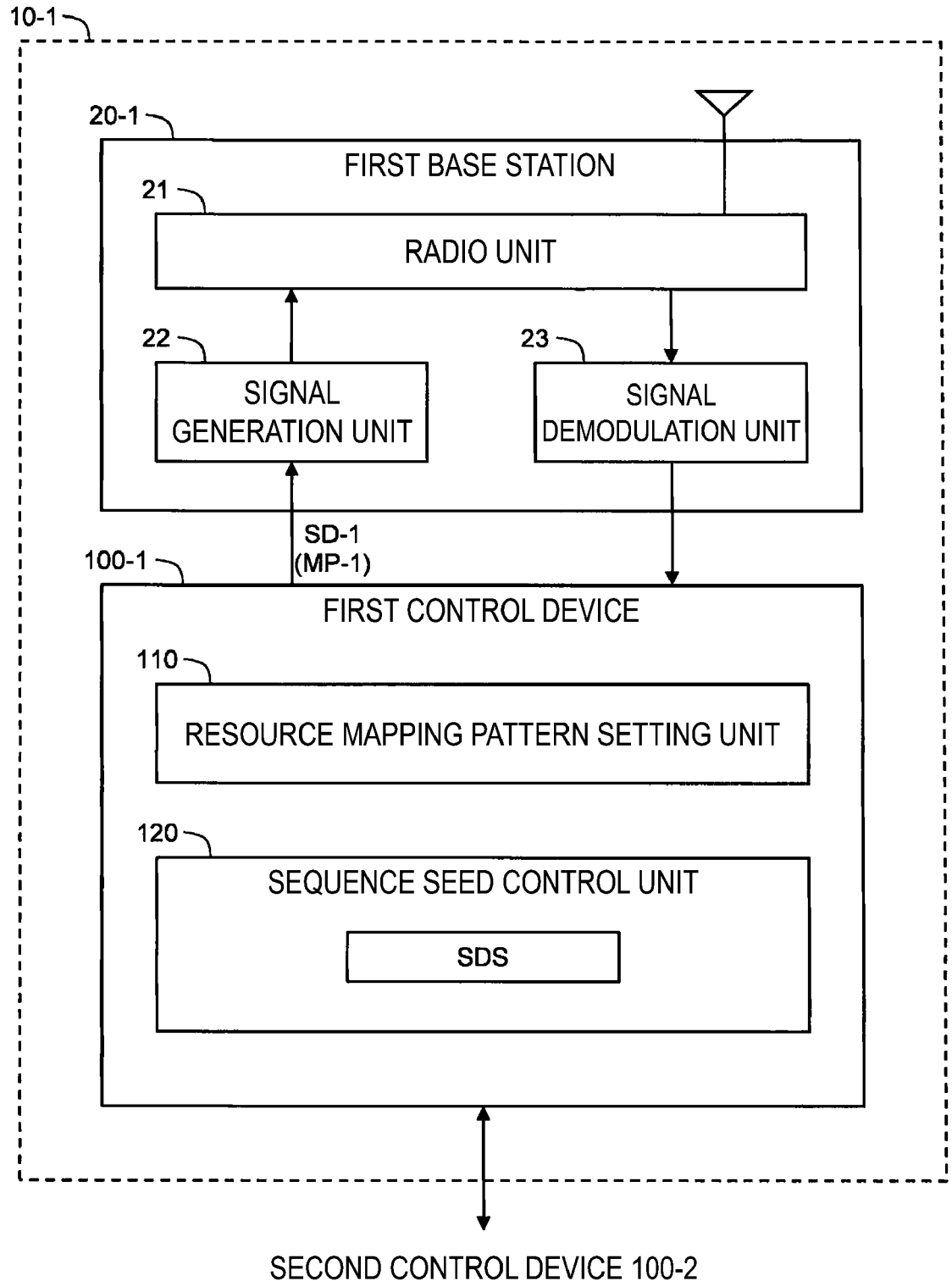
FIG. 5 is a block diagram showing a functional configuration example of a radio communication system according to an embodiment of the present disclosure.

FIG. 5 is a block diagram showing a functional configuration example of the radio communication system 10 according to the present embodiment. As a representative, a functional configuration example of the first radio communication system 10-1 is shown in FIG. 5. The same applies to the second radio communication system 10-2.

The first base station 20-1 includes a radio unit 21, a signal generation unit 22, and a signal demodulation unit 23. The radio unit 21 transmits and receives radio signals.

The signal generation unit 22 generates a transmission signal. The transmission signal includes the specific signal such as the synchronization signal and the reference signal. The signal generation unit 22 generates the specific signal based on the first seed SD-1. Moreover, the signal generation unit 22 generates the transmission signal including the specific signal that is mapped in accordance with the first resource mapping pattern MP-1. Then, the signal generation unit 22 outputs the transmission signal to the radio unit 21.

The signal demodulation unit 23 demodulates the radio signal received by the radio unit 21. The signal demodulation unit 23 transmits the received signal to the first control device 100-1 as necessary.

The first control device 100-1 includes a resource mapping pattern setting unit 110 and a sequence seed control unit 120.

The resource mapping pattern setting unit 110 determines the first resource mapping pattern MP-1 to be used. Then, the resource mapping pattern setting unit 110 notifies the signal generation unit 22 of the first base station 20-1 of the first resource mapping pattern MP-1. It should be noted that when the first base station 20-1 holds the resource mapping pattern MP that is uniquely defined for each country or for each region, the resource mapping pattern setting unit 110 may be omitted.

The sequence seed control unit 120 executes the sequence seed control. For example, the sequence seed control unit 120 holds a plurality of seed candidates SDS that are different from each other. The plurality of seed candidates SDS are defined in advance. The sequence seed control unit 120 determines the first seed SD-1 to be used from among the predetermined seed candidates SDS. Then, the sequence seed control unit 120 notifies the signal generation unit 22 of the first base station 20-1 of the first seed SD-1. Various examples of the sequence seed control will be described below.

The first control device 100-1 may communicate with the second control device 100-2. For example, the first control device 100-1 and the second control device 100-2 are connected to each other via a dedicated line. In another example, the first control device 100-1 and the second control device 100-2 may perform radio communication using integrated access and backhaul (IAB).

Figure 6:
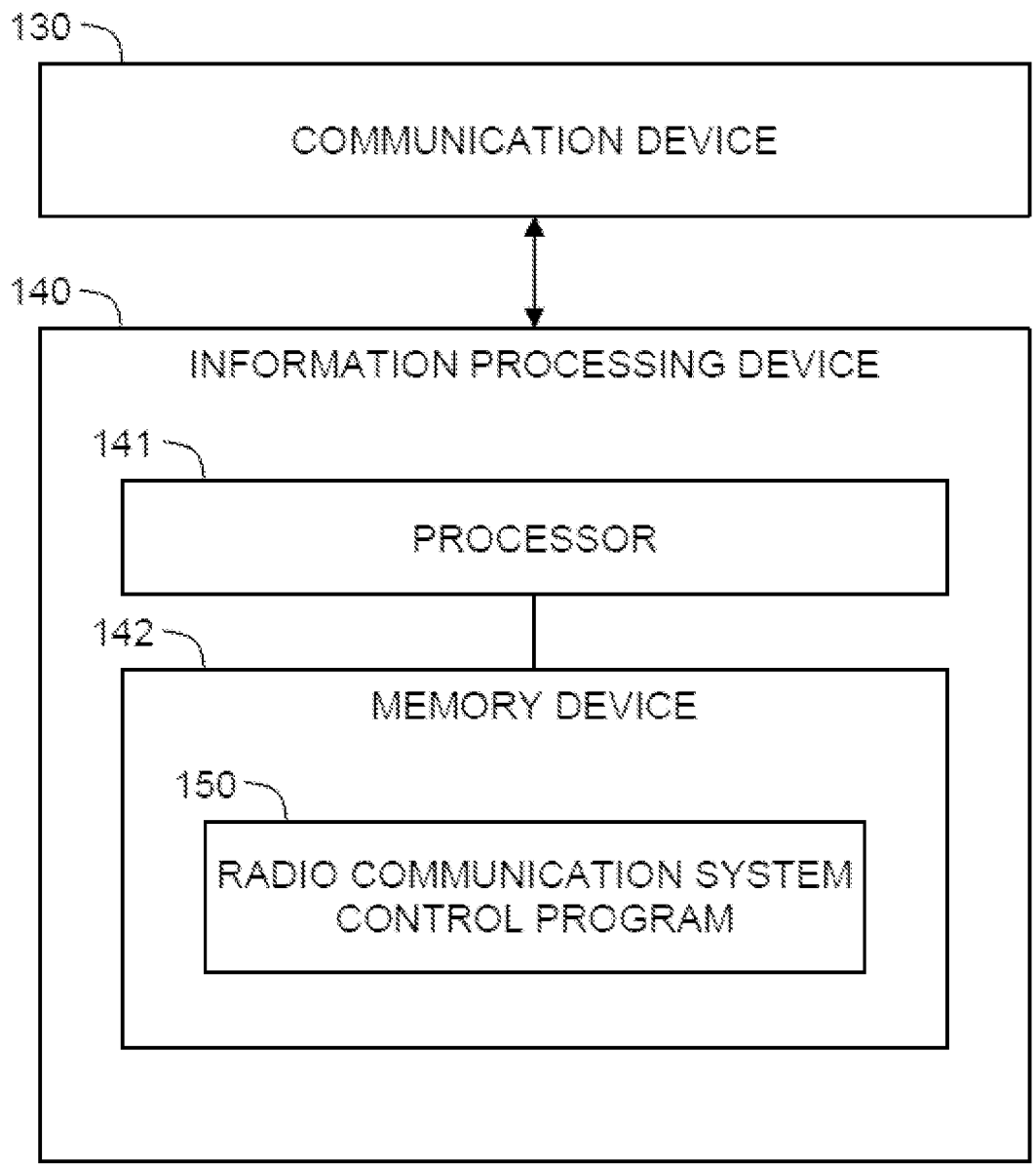
FIG. 6 is a block diagram showing a configuration example of a control device for a radio communication system according to an embodiment of the present disclosure.

FIG. 6 is a block diagram showing a configuration example of the control device 100 according to the present embodiment. As a representative, a configuration example of the first control device 100-1 is shown in FIG. 6. The same applies to the second control device 100-2.

The first control device 100-1 includes a communication device 130 and an information processing device 140.

The communication device 130 communicates with the first base station 20-1. Moreover, the communication device 130 communicates with the second control device 100-2. As described above, the communication scheme may be a wired communication scheme or a radio communication scheme.

The information processing device 140 is a computer that executes a variety of information processing. For example, the information processing device 140 includes a processor 141 and a memory device 142. The processor 141 executes a variety of information processing. For example, the processor 141 includes a central processing unit (CPU). The memory device 142 stores a variety of information used for the processing executed by the processor 141. Examples of the memory device 142 include a volatile memory, a non-volatile memory, a hard disk drive (HDD), a solid state drive (SDD), and the like.

A radio communication system control program 150 is a computer program executed by a computer. Functions of the information processing device 140 are implemented by the processor 141 executing the radio communication system control program 150. The radio communication system control program 150 is stored in the memory device 142. The radio communication system control program 150 may be recorded on a non-transitory computer-readable recording medium. The radio communication system control program 150 may be provided via a network.

The information processing device 140 may be implemented by using hardware such as an application specific integrated circuit (ASIC), a programmable logic device (PLD), or a field programmable gate array (FPGA).

The resource mapping pattern setting unit 110 and the sequence seed control unit 120 described above are implemented by the communication device 130 and the information processing device 140.

3. Processing Performed by Radio Communication System

Figure 7:
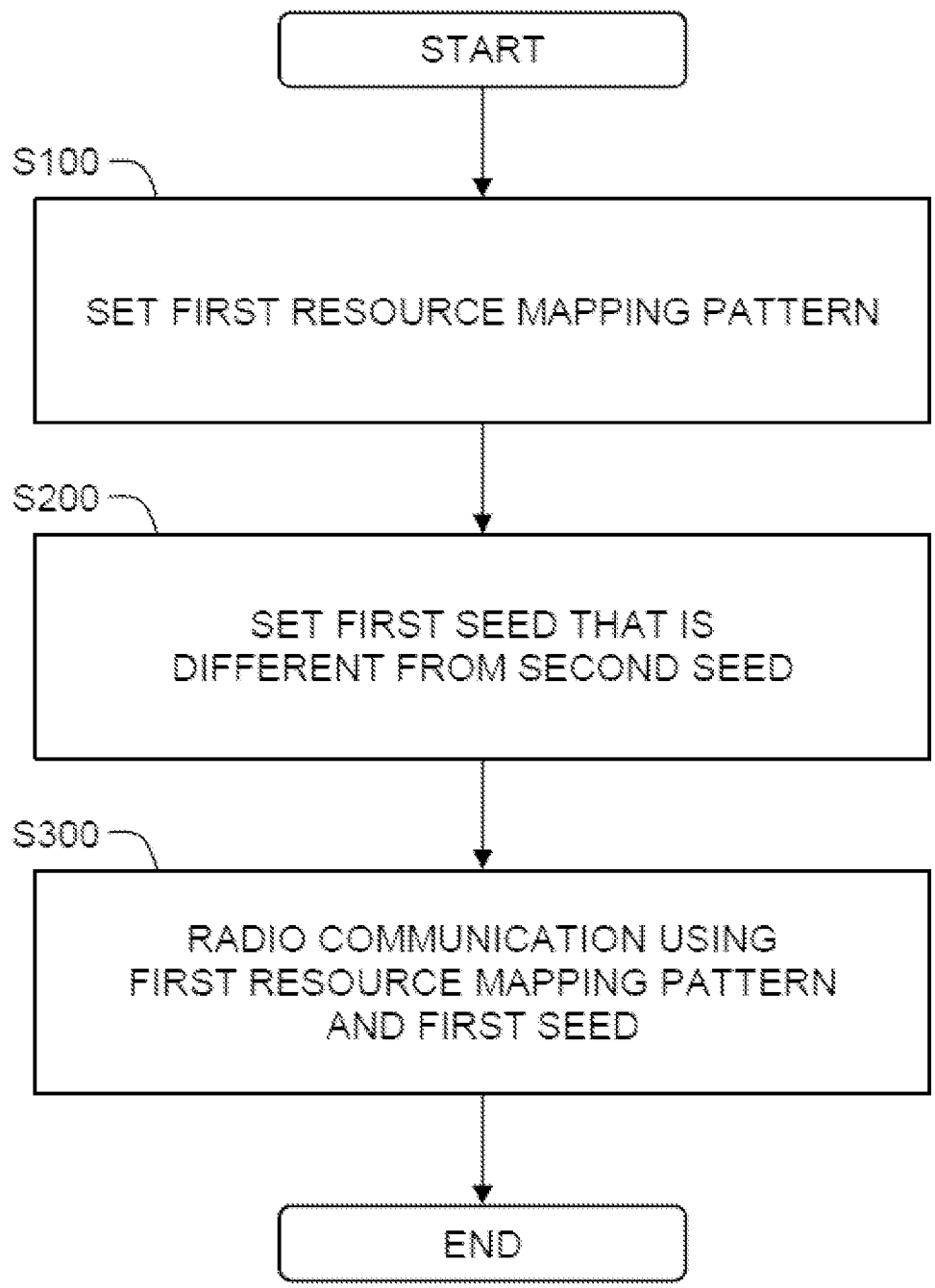
FIG. 7 is a flowchart showing processing performed by a radio communication system according to an embodiment of the present disclosure.

FIG. 7 is a flowchart showing processing performed by the radio communication system 10 according to the present embodiment. Here, processing performed by the first radio communication system 10-1 will be described as a representative. The same applies to the second radio communication system 10-2.

3-1. Step S100

In Step S100, the resource mapping pattern setting unit 110 of the first control device 100-1 sets the first resource mapping pattern MP-1. In particular, the resource mapping pattern setting unit 110 sets the first resource mapping pattern MP-1 so as to be identical to the second resource mapping pattern MP-2. Hereinafter, some examples of the method for setting the first resource mapping pattern MP-1 will be described.

3-1-1. First Example

In a first example, the resource mapping pattern MP is uniquely defined for each country or for each region. In this case, the resource mapping pattern setting unit 110 holds the resource mapping pattern MP that is uniquely defined. The resource mapping pattern setting unit 110 notifies the first base station 20-1 of the resource mapping pattern MP as the first resource mapping pattern MP-1. It should be noted that when the first base station 20-1 holds the resource mapping pattern MP in advance, Step S100 may be omitted.

3-1-2. Second Example

Figure 8:
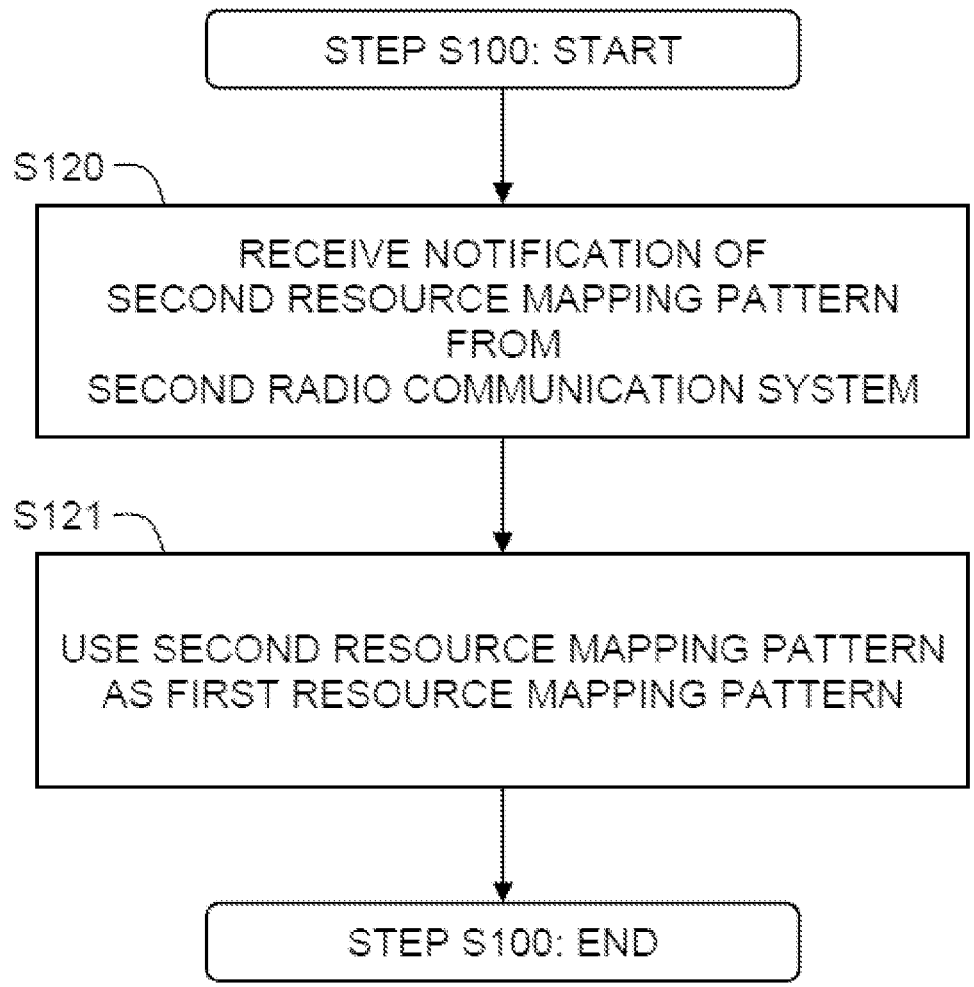
FIG. 8 is a flowchart showing a second example of setting of a resource mapping pattern (Step S100) according to an embodiment of the present disclosure.

FIG. 8 is a flowchart showing a second example of Step S100.

In Step S120, the resource mapping pattern setting unit 110 receives a notification of the "second resource mapping pattern MP-2" from the second control device 100-2 of the second radio communication system 10-2.

In Step S121, the resource mapping pattern setting unit 110 notifies the first base station 20-1 of the second resource mapping pattern MP-2 as the first resource mapping pattern MP-1. In this manner, it is possible to surely make the first resource mapping pattern MP-1 and the second resource mapping pattern MP-2 be identical to each other.

3-1-3. Third Example

Figure 9:
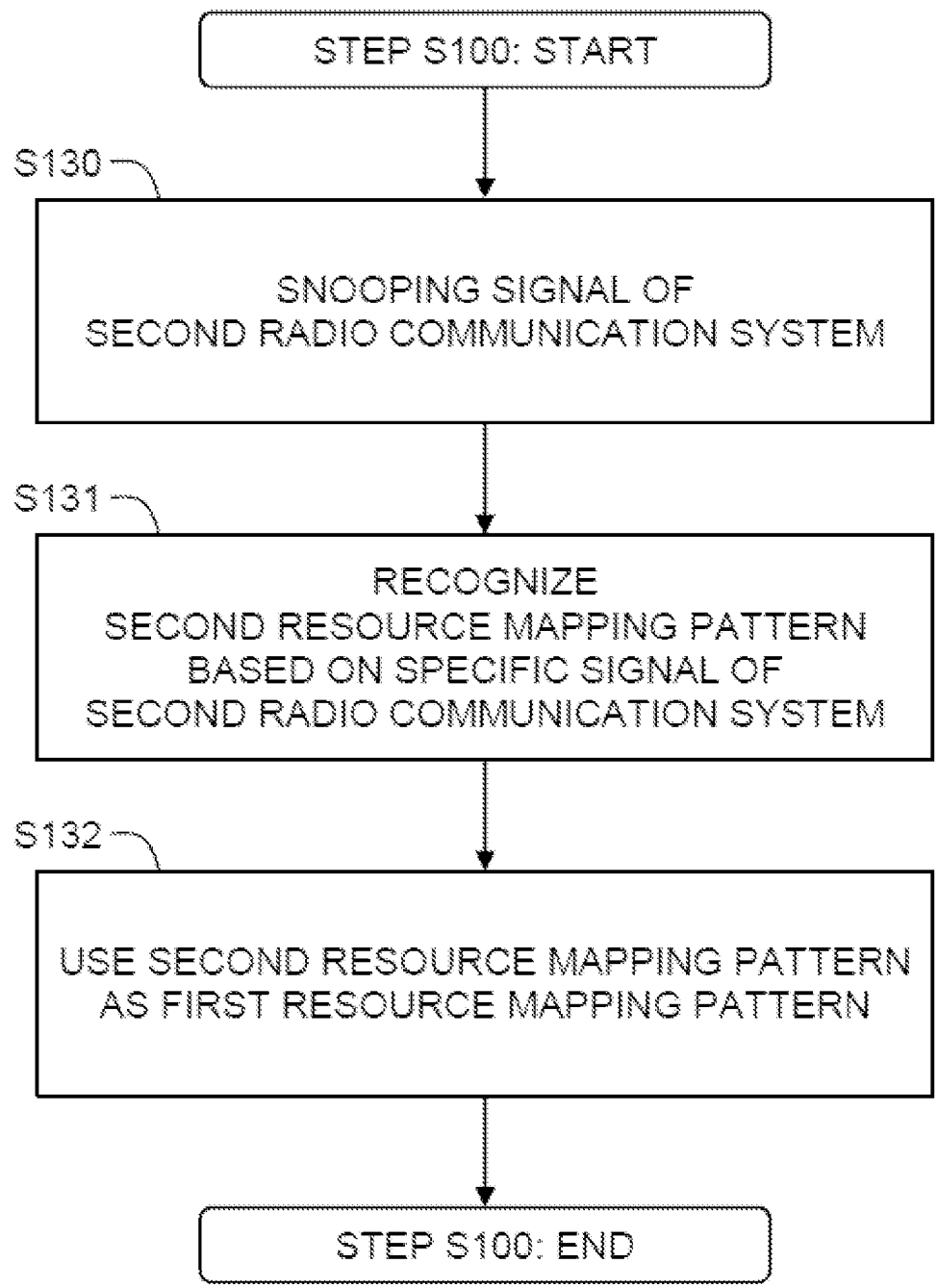
FIG. 9 is a flowchart showing a third example of setting of a resource mapping pattern (Step S100) according to an embodiment of the present disclosure.

FIG. 9 is a flowchart showing a third example of Step S100.

In Step S130, the first base station 20-1 receives (snoops) a signal transmitted from the second base station 20-2 of the second radio communication system 10-2. The signal demodulation unit 23 of the first base station 20-1 notifies the resource mapping pattern setting unit 110 of the received signal. Alternatively, the signal demodulation unit 23 notifies the resource mapping pattern setting unit 110 of the specific signal included in the received signal.

In Step S131, the resource mapping pattern setting unit 110 recognizes the second resource mapping pattern MP-2 used in the second radio communication system 10-2, based on the specific signal included in the received signal.

In Step S132, the resource mapping pattern setting unit 110 notifies the first base station 20-1 of the second resource mapping pattern MP-2 as the first resource mapping pattern MP-1.

In this manner, it is possible to make the first resource mapping pattern MP-1 and the second resource mapping pattern MP-2 be identical to each other.

According to the third example, the first control device 100-1 is able to set the first resource mapping pattern MP-1 by itself without receiving any notification from the second control device 100-2.

3-2. Step S200

In Step S200, the sequence seed control unit 120 of the first control device 100-1 performs the sequence seed control. Specifically, the sequence seed control unit 120 sets the first seed SD-1 to be different from the second seed SD-2. Then, the sequence seed control unit 120 notifies the first base station 20-1 of the first seed SD-1.

Hereinafter, various examples of the sequence seed control (Step S200) will be described.

3-2-1. First Example

Figure 10:
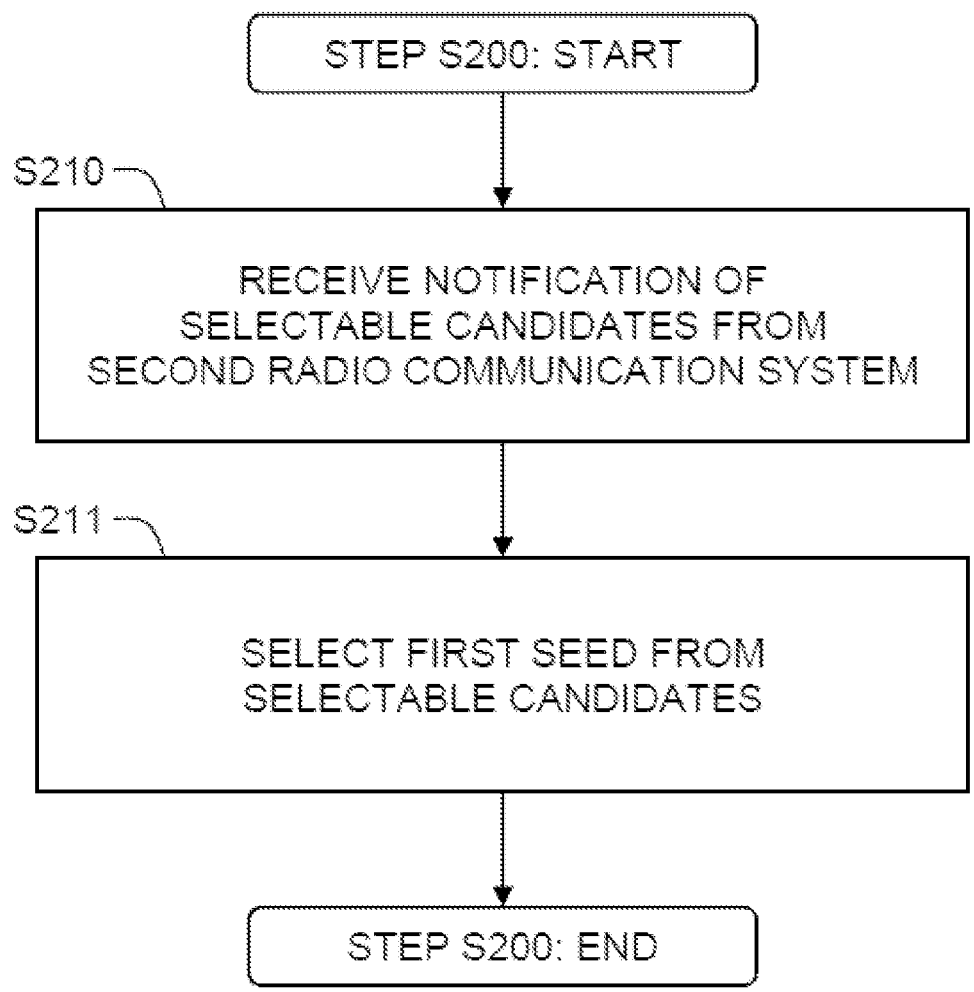
FIG. 10 is a flowchart showing a first example of sequence seed control (Step S200) according to an embodiment of the present disclosure.

FIG. 10 is a flowchart showing a first example of the sequence seed control (Step S200).

In Step S210, the sequence seed control unit 120 receives a notification of "selectable candidates" from the second control device 100-2 of the second radio communication system 10-2. The selectable candidates include at least one seed candidate that is different from the second seed SD-2.

For example, the second control device 100-2 holds the predetermined seed candidates SDS, as in the case of the first control device 100-1. The second control device 100-2 can generate the selectable candidates based on the second seed SD-2 in use and the predetermined seed candidates SDS. The second control device 100-2 may periodically notify the selectable candidates.

In Step S211, the sequence seed control unit 120 selects the first seed SD-1 from among the received selectable candidates.

In this manner, it is possible to surely set the first seed SD-1 that is different from the second seed SD-2.

3-2-2. Second Example

Figure 11:
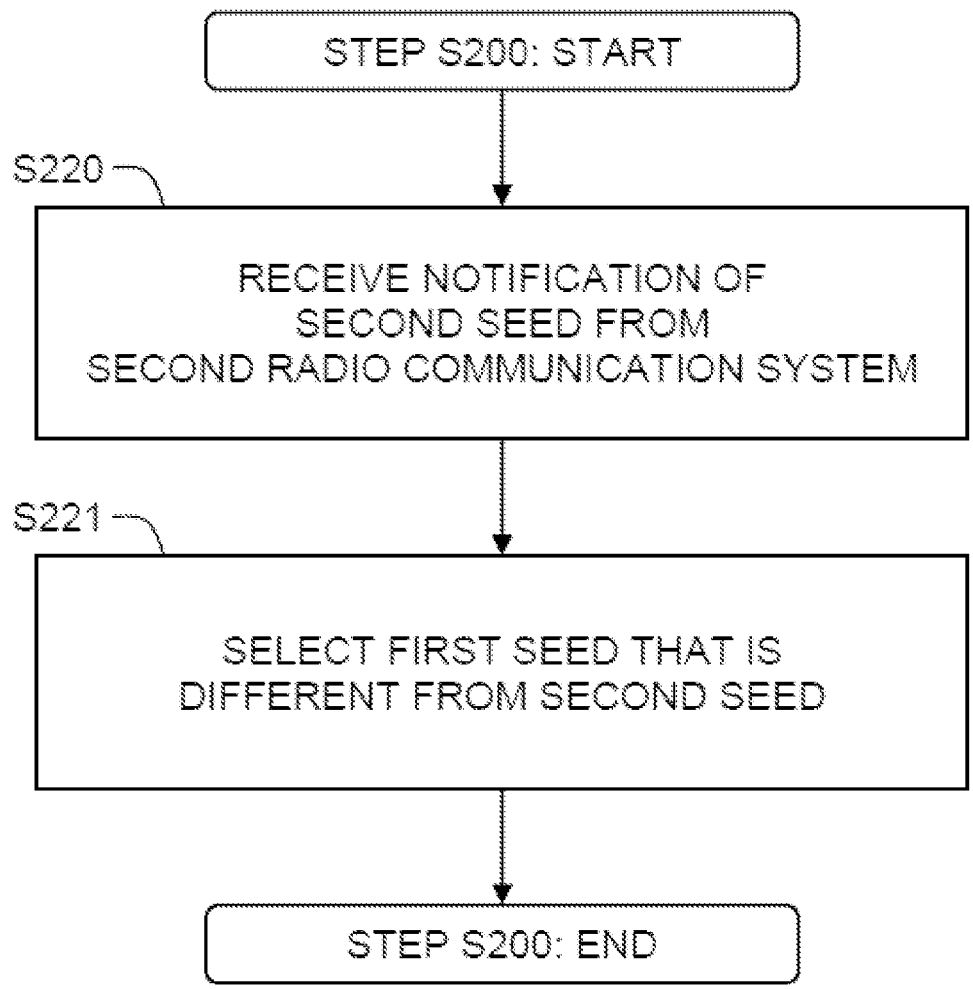
FIG. 11 is a flowchart showing a second example of sequence seed control (Step S200) according to an embodiment of the present disclosure.

FIG. 11 is a flowchart showing a second example of the sequence seed control (Step S200). The second example is a modification example of the first example.

In Step S220, the sequence seed control unit 120 receives a notification of the "second seed SD-2" from the second control device 100-2 of the second radio communication system 10-2.

In Step S221, the sequence seed control unit 120 selects the first seed SD-1 that is different from the second seed SD-2 from among the predetermined seed candidates SDS.

In this manner, it is possible to surely set the first seed SD-1 that is different from the second seed SD-2.

3-2-3. Third Example

Figure 12:
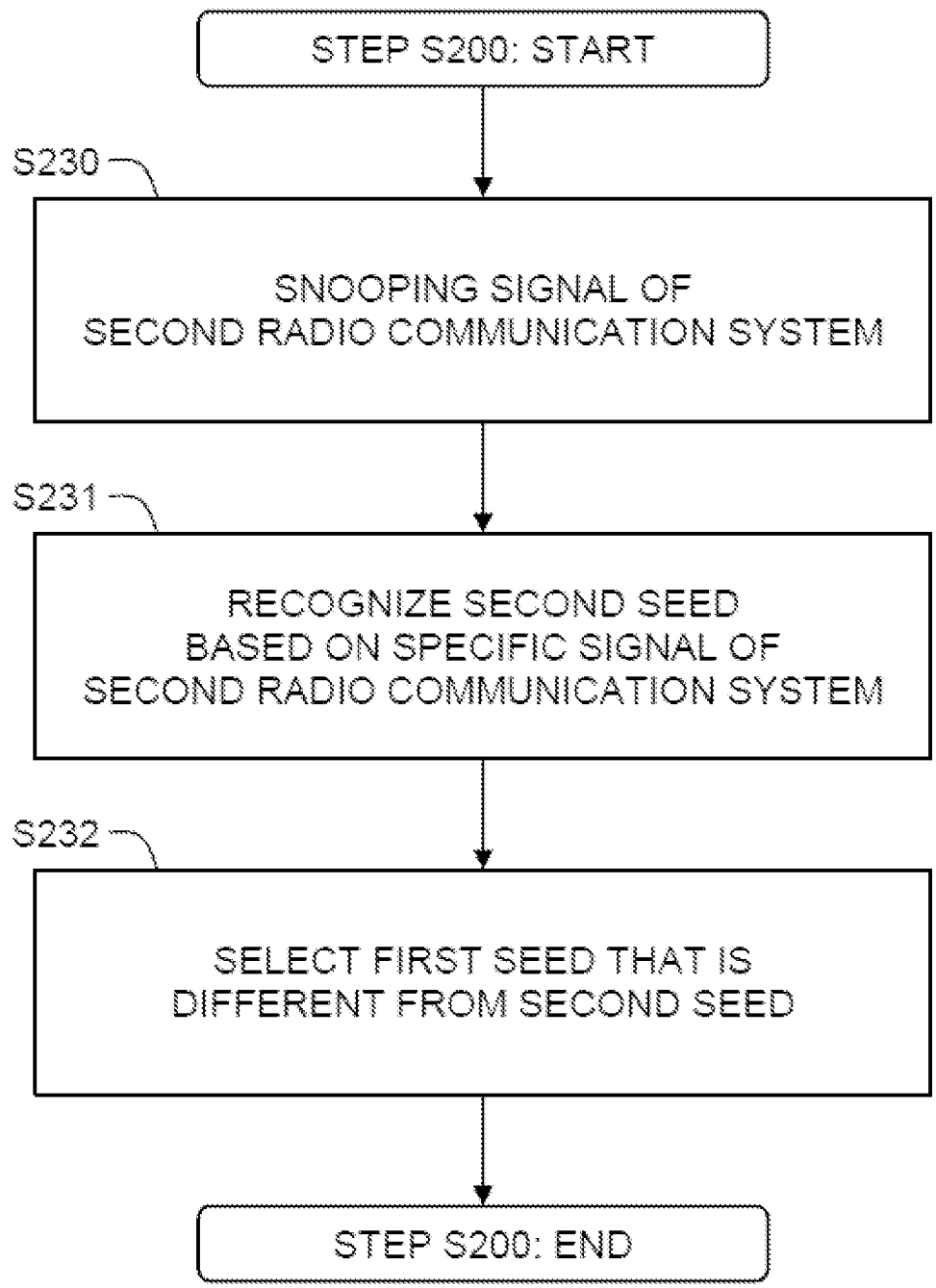
FIG. 12 is a flowchart showing a third example of sequence seed control (Step S200) according to an embodiment of the present disclosure.

FIG. 12 is a flowchart showing a third example of the sequence seed control (Step S200).

In Step S230, the first base station 20-1 receives (snoops) a signal transmitted from the second base station 20-2 of the second radio communication system 10-2. The signal demodulation unit 23 of the first base station 20-1 notifies the sequence seed control unit 120 of the received signal. Alternatively, the signal demodulation unit 23 notifies the sequence seed control unit 120 of the specific signal included in the received signal.

It should be noted that when the setting of the first resource mapping pattern MP-1 is performed by the aforementioned method described in FIG. 9, Step S130 and Step S230 may be unified.

In Step S231, the sequence seed control unit 120 recognizes the second seed SD-2 used in the second radio communication system 10-2, based on the specific signal included in the received signal.

In Step S232, the sequence seed control unit 120 selects the first seed SD-1 that is different from the second seed SD-2 from among the predetermined seed candidates SDS.

According to the third example, the first control device 100-1 is able to set the first seed SD-1 by itself without receiving any notification from the second control device 100-2.

3-2-4. Fourth Example

Figure 13:
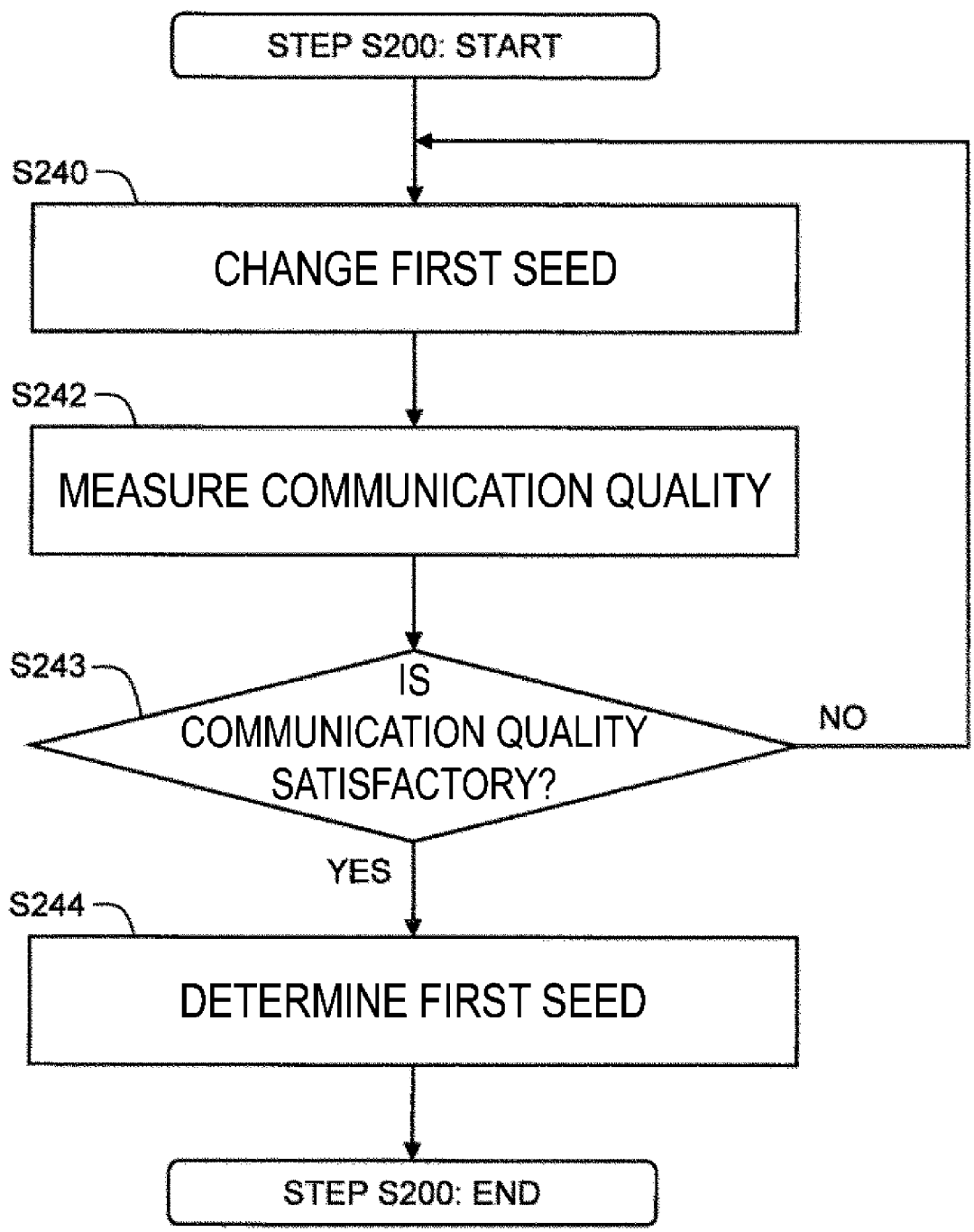
FIG. 13 is a flowchart showing a fourth example of sequence seed control (Step S200) according to an embodiment of the present disclosure.

FIG. 13 is a flowchart showing a fourth example of the sequence seed control (Step S200). The processing flow shown in FIG. 13 is periodically executed.

In Step S240, the sequence seed control unit 120 changes the first seed SD-1 to be used. In other words, the sequence seed control unit 120 selects one that is different from the previous one from among the predetermined seed candidates SDS.

In Step S242, the first base station 20-1 performs the radio communication by using the first seed SD-1 set in Step S240. Also, the first base station 20-1 measures and records communication quality. Examples of a parameter indicating the communication quality include a signal to interference power ratio (SIR) and the like. The first base station 20-1 notifies the sequence seed control unit 120 of the communication quality.

In Step S243, the sequence seed control unit 120 determines whether or not the communication quality is satisfactory. For example, the sequence seed control unit 120 determines whether or not the communication quality is equal to or higher than a certain level. When the communication quality is lower than the certain level (Step S243; No), the processing returns back to Step S240. On the other hand, when the communication quality is equal to or higher than the certain level (Step S243; Yes), the processing proceeds to Step S244.

In another example, the sequence seed control unit 120 determines whether or not the communication quality is the top quality. When the communication quality is not the top quality (Step S243; No), the processing returns back to Step S240. On the other hand, when the communication quality is the top quality (Step S243; Yes), the processing proceeds to Step S244.

In Step S244, the sequence seed control unit 120 determines the one selected in Step S240 as the first seed SD-1.

As described above, according to the fourth example, the first seed SD-1 is periodically switched between the predetermined seed candidates SDS. In other words, hopping of the first seed SD-1 is performed. Although there is a little possibility that the first seed SD-1 and the second seed SD-2 temporarily overlap, the first seed SD-1 is in general set to be different from the second seed SD-2. In particular, the first seed SD-1 with the satisfactory communication quality is considered to be different from the second seed SD-2. Thus, the effects of the present embodiment can be obtained.

3-2-5. Fifth Example

Figure 14:
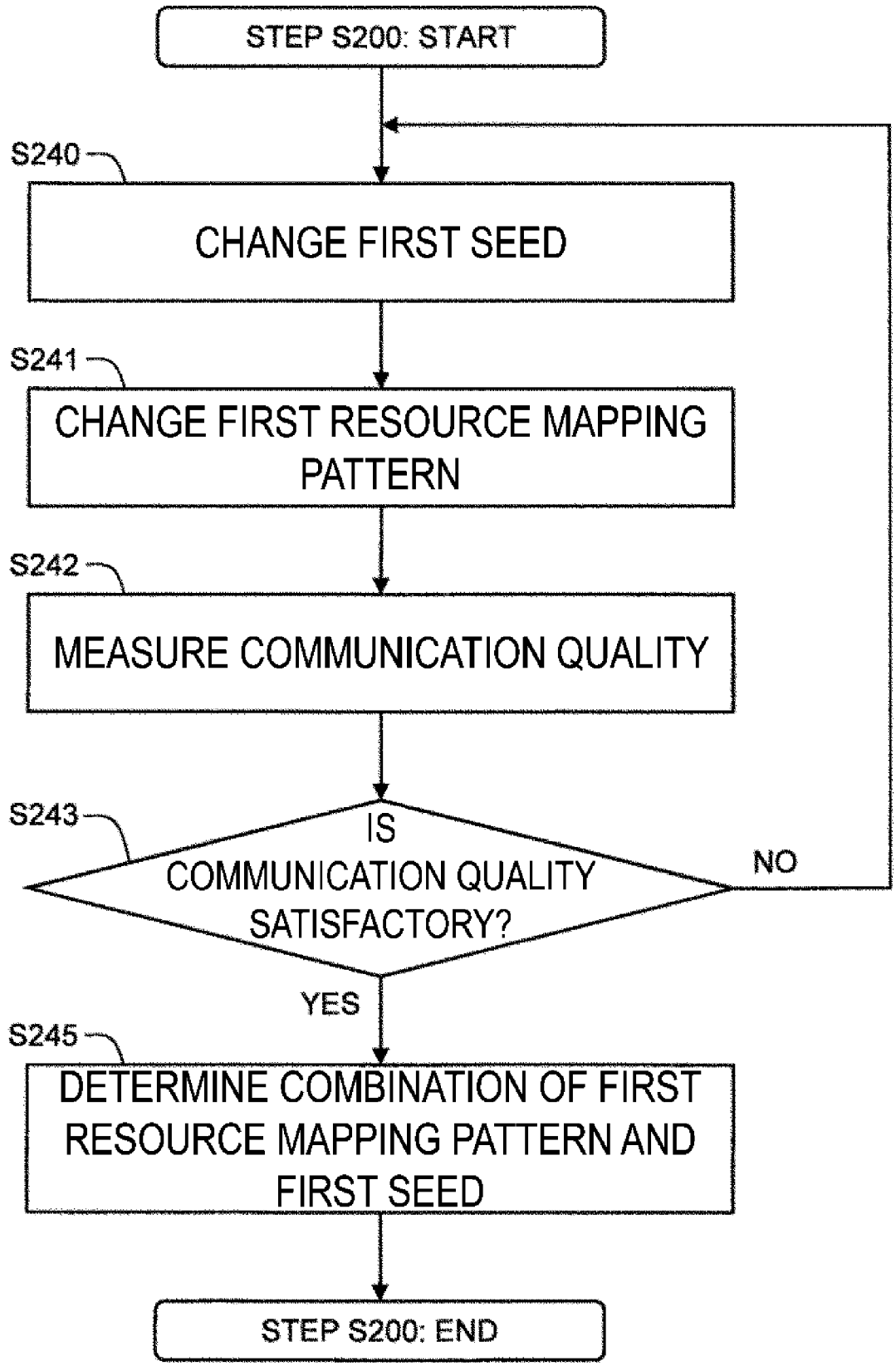
FIG. 14 is a flowchart showing a fifth example of sequence seed control (Step S200) according to an embodiment of the present disclosure.

FIG. 14 is a flowchart showing a fifth example of the sequence seed control (Step S200). The fifth example is a modification example of the fourth example. In the fifth example, the setting of the first resource mapping pattern MP-1 (Step S100) is performed at the same time.

Step S240 is similar to that in the case of the fourth example.

In Step S241, the resource mapping pattern setting unit 110 switches the first resource mapping pattern MP-1. For example, a plurality of resource mapping pattern candidates that do not overlap each other are defined in advance. The resource mapping pattern setting unit 110 selects one that is different from the previous one from among the predetermined resource mapping pattern candidates.

In Step S242, the first base station 20-1 performs the radio communication by using the first seed SD-1 set in Step S240 and the first resource mapping pattern MP-1 set in Step S241. The first base station 20-1 measures the communication quality and notifies the sequence seed control unit 120 of the communication quality.

When the communication quality is not satisfactory (Step S243; No), the processing returns back to Step S240. On the other hand, when the communication quality is satisfactory (Step S243; Yes), the processing proceeds to Step S245.

In Step S245, the sequence seed control unit 120 determines the one selected in Step S240 as the first seed SD-1. In addition, the resource mapping pattern setting unit 110 determines the one selected in Step S241 as the first resource mapping pattern MP-1. That is, the sequence seed control unit 120 determines a combination of the first seed SD-1 and the first resource mapping pattern MP-1.

As described above, according to the fifth example, hopping of the first resource mapping pattern MP-1 also is performed. Even when the second resource mapping pattern MP-2 is changed, searching for the first resource mapping pattern MP-1 that can achieve the satisfactory communication quality makes it possible to increase a probability that the first resource mapping pattern MP-1 and the second resource mapping pattern MP-2 match each other. The predetermined resource mapping pattern candidates may be further narrowed down from those defined as a standard. As a result, it is possible to further increase the probability that the first resource mapping pattern MP-1 and the second resource mapping pattern MP-2 match each other.

3-3. Step S300

In Step S300 (see FIG. 7), the first base station 20-1 performs the radio communication by using the first seed SD-1 and the first resource mapping pattern MP-1. Specifically, the signal generation unit 22 generates the specific signal based on the first seed SD-1. Furthermore, the signal generation unit 22 generates the transmission signal including the specific signal that is mapped in accordance with the first resource mapping pattern MP-1. Then, the signal generation unit 22 outputs the transmission signal to the radio unit 21. The radio unit 21 transmits the transmission signal.

REFERENCE SIGNS LIST

10 Radio communication system
10-1 First radio communication system 10-2 Second radio communication system
20 Base station
20-1 First base station
20-2 Second base station
21 Radio unit
22 Signal generation unit
23 Signal demodulation unit
30 Cell
30-1 First cell
30-2 Second cell
100 Control device
100-1 First control device
100-2 Second control device
110 Resource mapping pattern setting unit
120 Sequence seed control unit
130 Communication device
140 Information processing device
141 Processor
142 Memory device
150 Radio communication system control program
MP-1 First resource mapping pattern
MP-2 Second resource mapping pattern
SD-1 First seed
SD-2 Second seed

The invention claimed is:

1. A radio communication system that performs radio communication in a first cell, the radio communication system comprising:
a base station configured to generate, based on a first seed, a specific signal including at least one of a synchronization signal and a reference signal and to use a first resource mapping pattern as a resource mapping pattern of the specific signal to perform the radio communication; and
a control device, including one or more processors, configured to set the first seed and the first resource mapping pattern, wherein
in a second cell that is adjacent to the first cell, a second radio communication system is configured to generate the specific signal based on a second seed and to use a second resource mapping pattern as a resource mapping pattern of the specific signal to perform radio communication, and
the control device is configured to set the first seed to be different from the second seed when the first resource mapping pattern is identical to the second resource mapping pattern.

2. The radio communication system according to claim 1, wherein
the control device is configured to:
receive a notification of at least one seed candidate that is different from the second seed from the second radio communication system; and
select the first seed from the at least one seed candidate.

3. The radio communication system according to claim 1, wherein
the control device is configured to:
receive a notification of the second seed from the second radio communication system; and
select the first seed that is different from the second seed from among predetermined seed candidates.

4. The radio communication system according to claim 1, wherein
the control device is configured to:
recognize the second seed based on the specific signal included in a signal transmitted from a base station of the second radio communication system; and
select the first seed that is different from the second seed from among predetermined seed candidates.

5. The radio communication system according to claim 1, wherein
the control device is configured to periodically switch the first seed between predetermined seed candidates.

6. A control method for a radio communication system, wherein
in a first cell, a first radio communication system is configured to generate, based on a first seed, a specific signal including at least one of a synchronization signal and a reference signal and to use a first resource mapping pattern as a resource mapping pattern of the specific signal to perform radio communication, and
in a second cell that is adjacent to the first cell, a second radio communication system is configured to generate the specific signal based on a second seed and to use a second resource mapping pattern as a resource mapping pattern of the specific signal to perform radio communication,
the control method comprising a process of setting the first seed and the second seed to be different from each other when the first resource mapping pattern is identical to the second resource mapping pattern.

7. A control device for a radio communication system, wherein
in a first cell, the radio communication system is configured to generate, based on a first seed, a specific signal including at least one of a synchronization signal and a reference signal and to use a first resource mapping pattern as a resource mapping pattern of the specific signal to perform radio communication, and
in a second cell that is adjacent to the first cell, a second radio communication system is configured to generate the specific signal based on a second seed and to use a second resource mapping pattern as a resource mapping pattern of the specific signal to perform radio communication,
the control device comprising one or more processors configured to set the first seed to be different from the second seed when the first resource mapping pattern is identical to the second resource mapping pattern.

* * * * *